May 23, 1944.    J. H. SCHREIBER ET AL    2,349,382
MACHINE TOOL
Filed Dec. 12, 1940    2 Sheets-Sheet 2

Inventors
John H. Schreiber
Francis H. Dean
by John D. Rippey
Their Attorney.

Patented May 23, 1944

2,349,382

UNITED STATES PATENT OFFICE 2,349,382

MACHINE TOOL

John H. Schreiber, St. Louis, and Francis H. Dean, Normandy, Mo., assignors to General Engineering & Mfg. Co., St. Louis, Mo., a corporation of Missouri Application December 12, 1940, Serial No. 369,698

6 Claims. (Cl. 184—6)

This invention relates to machine tools; and has special reference to means for lubricating the machine and preventing operation thereof when the amount of lubricating oil becomes insufficient or below a predetermined amount.

Objects of the invention are to provide means for preventing operation of a machine tool or other mechanism when the available supply of lubricating oil becomes insufficient or below a predetermined amount, or when the pump for delivering oil to the operating mechanism fails to function, or when the flow of oil becomes clogged or otherwise rendered inadequate; to provide means for enabling the machine to continue to operate to finish the job or work in process, and to prevent restarting of the machine after it has been stopped by the operator when the avialable supply of lubricating oil becomes insufficient or below a predetermined amount, or when the pump for delivering oil to the operating mechanism fails to function, or when the flow of oil becomes clogged or otherwise rendered inadequate; to prevent engagement of the controlling clutch of the machine when the driving motor is not operating; to provide mechanism for relieving the motor of high starting load even when the invention is embodied in heavy machinery; and to provide means making possible visual inspection of that part of the invention which prevents operation of the machine or engagement of the clutch under any of the conditions named or under any other predetermined conditions.

Another object of the invention is to provide a highly simplified and efficient lubricating system for the rocker arm connections of shapers and other machine tools, or any machines in which the invention may be appropriately embodied.

Various other objects and advantages of the invention will be apparent from the following description, reference being made to the annexed drawings, in which—

Figure 1:
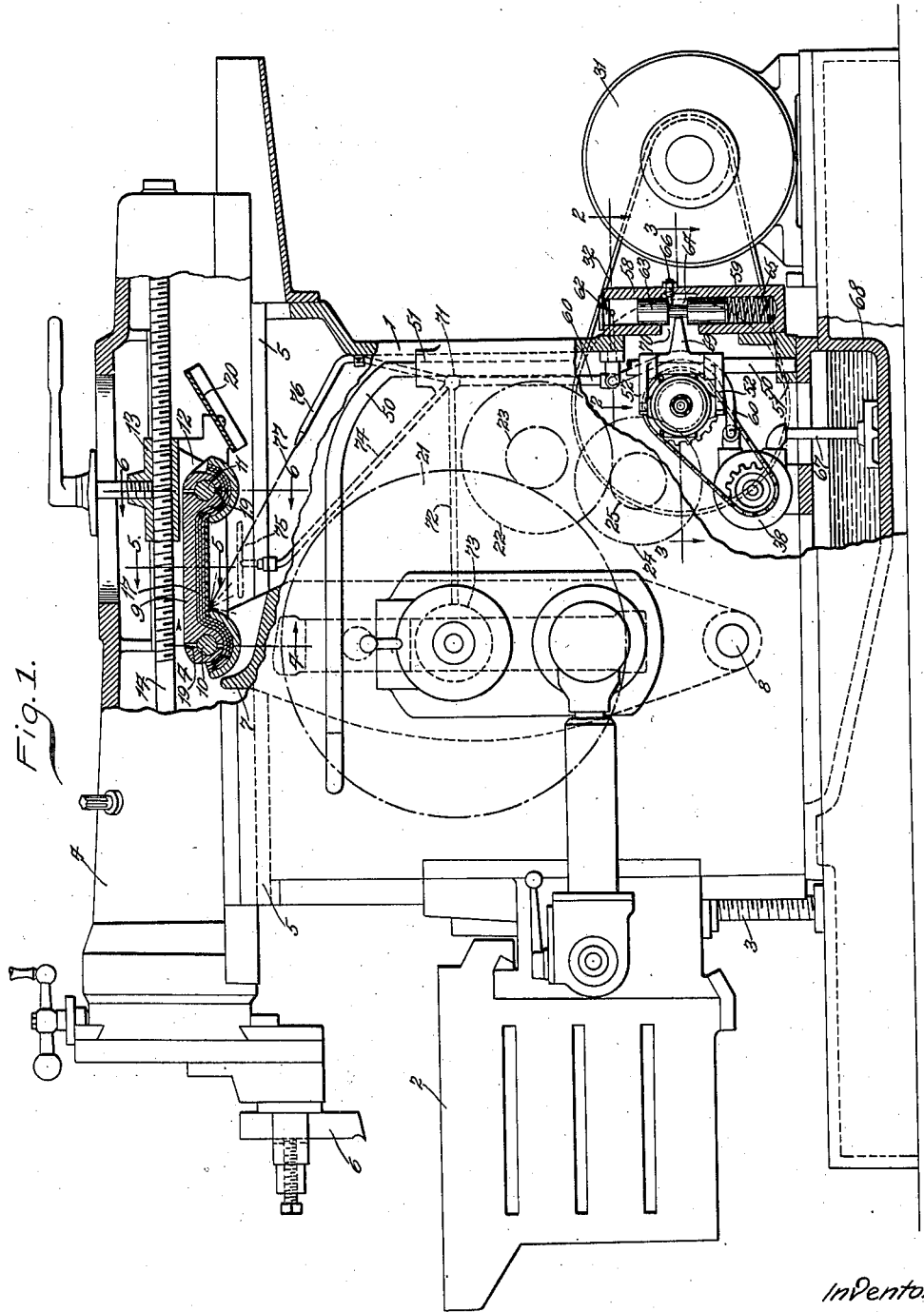
Fig. 1 is a side elevation of a shaper having our invention embodied therein, parts being in section to show more clearly the features of the present invention.
Figures 4, 5:
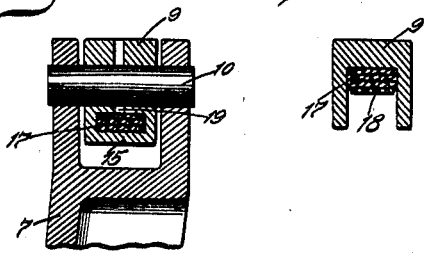
Figure 6:
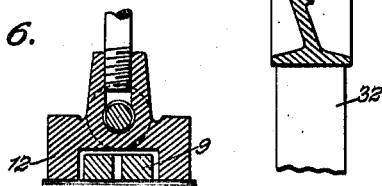

Figs. 4, 5 and 6 are sectional view on the lines 4—4, and 5—5, and 6—6, respectively, of Fig. 1.

The invention is adapted and intended for use in various types of machines. We have shown the invention embodied in a shaper, and it will be apparent that this is for illustrative purposes only and that the invention may be advantageously used in different forms and types of machines.

The shaper shown comprises a frame 1 provided with a work support 2 connected for vertical adjustment with a threaded shaft 3. A carriage 4 is mounted for horizontal reciprocating movements on guides 5 rigid with the frame 1 and supports a tool 6 for operating on the work located on the support 2 when the carriage and thereby the tool 6 are reciprocated. The machine includes a rocker arm 7 having its lower end supported by a pivot 8 mounted in the frame 1 and having its upper end connected with the carriage 4 for imparting reciprocating movements to said carriage when the rocker arm 7 is oscillated or rocked upon its supporting pivot 8. A link 9 provides pivotal connection between the carriage 4 and the upper end of the rocker arm 7 whereby rocking movements of said arm 7 will impart reciprocating movements to the carriage 4 and thereby to the tool 6. According to the present invention, the link 9 is of novel construction and replaces the usual conventional link provided to connect the carriage 4 with the upper end of the rocker arm 7.

As shown, one end of the link 9 is engaged with a pin 10 mounted in the upper end of the arm 7 and the opposite end of said link is engaged with a pin 11 mounted in depending ears 12 of a supporting sleeve 13 screwed on a shaft 14 mounted in and attached to the carriage 4. The ends of the link 9 below the pins 10 and 11 have walls 15 and 16 forming arcuate pockets or slots receiving the ends of wool yarn 17 or other appropriate capillary conducting material extending along the underside of the link 9 and into said pockets (Fig. 1). A plate 18 having numerous perforations therein is seated upon adjacent ends of the walls 15 and 16 and supports the capillary conducting material 17 between the pockets at the ends of the link 9. Passages 19 from the pockets at the ends of the link 9 are provided to conduct oil from said pockets to the pins 10 and 11 in order to keep said pins properly lubricated during operation of the machine. The said pockets communicate with the pivots 10 and 11 through the passages 19. These pockets and the capillary conducting material 17 are arranged to receive from the lubricating system and retain a quantity of lubricant and to apply said lubricant continuously to the connections 9, 10, 11, etc. after failure of the lubricating system from any cause to deliver lubricant to said connections and until an intended operation of the machine tool has been completed after such intended operation has been initiated.

An inclined shelf comprising a plate 20 is attached to the sleeve unit 13 and constitutes a deflecting baffle whereby oil projected upwardly into the carriage 4 as hereinafter described is caught and deflected downwardly into the frame 1 and onto the various gears 21, 22, 23, 24 and 25 constituting a train of gearing in the known type of machine shown for rocking or oscillating the rocker arm 7 upon its pivot 8 to reciprocate the carriage 4. Gears 26, 27, 28 and 29 are splined upon a tubular shaft 30 and are shiftable into and out of meshing engagement with respective gears 24 by known shifting devices, which are not herein illustrated, in order to operate the remaining gearing and thereby the rocker arm 7 at different selected speeds. This is to say that these shiftable gears constitute known variable speed drives for operating the machine at varying selected speeds. For present purposes, it is sufficient to state that these variable speed gears are of known arrangement and may be shifted by familiar and well known devices in present standard machines and do not require further illustration or description.

Figure 2:
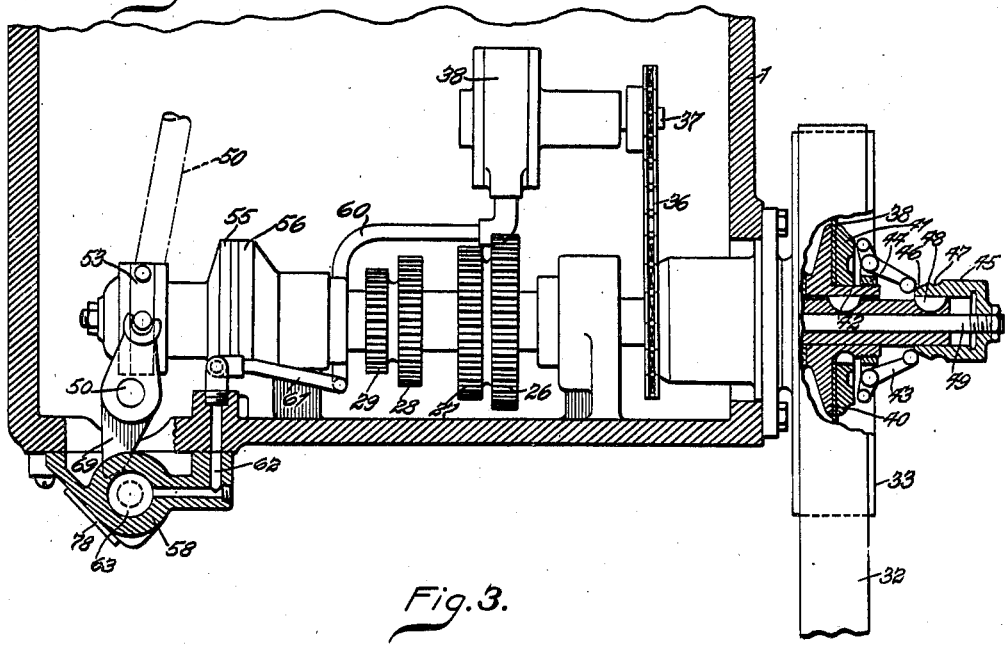
Fig. 2 is an enlarged horizontal sectional view on the line 2—2 of Fig. 1.
Figure 3:
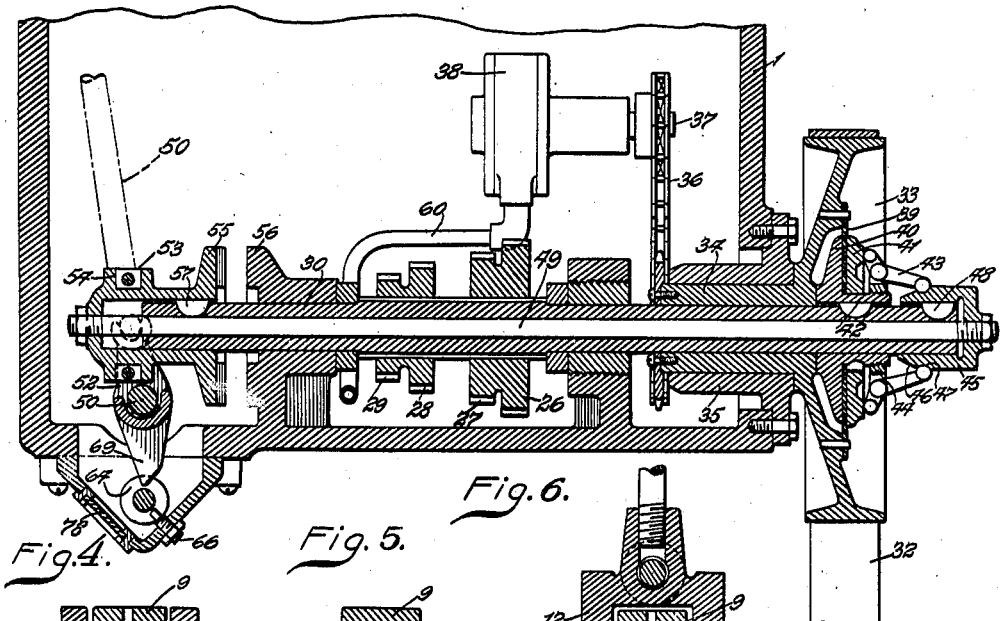
Fig. 3 is a sectional view similarly enlarged on the line 3—3 of Fig. 1.

The shaft and pulley of a motor 31 has driving connection 32 with a pulley 33. The hub 34 of the pulley 33 is rotatively journalled in a bearing 35 supported by the frame 1, and has driving connection 36 with the shaft 37 of an oil pump 38 (Figs. 2 and 3). The shaft 30 extends through the hub 34 of the pulley 33 in a manner leaving said pulley free to rotate independently of and about said shaft. A clutch disc 39 attached to the pulley 33 extends between a clutch element 40 that is keyed to the shaft 30 and a clutch element 41 mounted for sliding movements on the hub 42 of the clutch element 40. A series of angular levers 43 are pivotally supported by a nut 44 screwed on the hub 42. Said levers 43 are operative to cause the clutch elements 40 and 41 to clamp between them the clutch disc 39 and thereby rotate the shaft 30 by the pulley 33 and drive the gearing for operating the rocker arm 7.

A tubular actuator 45 encloses one end of the shaft 30 and is formed with an inclined or beveled margin 46 arranged to engage the ends of the levers 43 and to operate said levers when the actuator 45 is moved toward the pulley 33 and thereby set the clutch to rotate the shaft 30 by the pulley 33. A circumferential groove 47 in the actuator 45 receives the ends of the levers 43 and yieldingly holds the parts in the positions they occupy when the clutch is set to rotate the shaft 30 by the pulley 33, as shown in Fig. 3. The actuator 45 has a key 48 engaging the shaft 30 so that said actuator will be rotated by said shaft 30 when the clutch is set.

The actuator 45 is attached to one end of a rod 49 extending axially through the shaft 30 for relative longitudinal movements, as required to operate the actuator 45 to set and release the clutch. An angular control rod 50 is mounted for turning movements in bearings 51. A pair of arms 52 are attached to the rod 50 and engage a ring 53 mounted in a groove 54 on the hub of a friction brake 55 which is shiftable into and out of engagement with a stationary braking element 56. The brake 55 is slidable longitudinally along the shaft 30 and is connected with said shaft by a key 57 so that, when the brake is loose and the clutch at the opposite end of the shaft 30 is set (Fig. 3), the brake part 55 will be rotated by said shaft 30. The brake 55 is attached to the rod 49 to shift said rod longitudinally to set and to release the clutch for driving the shaft 30 by the pulley 33. When the brake 55 is in engagement with the braking element 56, the clutch for effecting driving connection between the pulley 53 and the shaft 30 is loose (Fig. 2); and, when the rod 49 is moved longitudinally by disengaging the brake 55 from the stationary braking element 56, the clutch is set to drive the shaft 30 by the pulley 33 (Fig. 3).

Our present invention comprises mechanism for preventing setting of the clutch and thereby preventing operation of the machine when the supply of lubricating oil for lubricating the machine becomes insufficient for that purpose or when the pump 38 for delivering the oil to the operating mechanism fails to function, or when the flow of oil becomes clogged or otherwise rendered inadequate. This part of the invention functions to prevent effectve movement or operation of the means 50 for engaging and disengaging the clutch device 39—40—41 when the pressure of lubricant from the pump 38 is less than a datum pressure, and to leave said means 50 free for operation to engage said clutch device when the pressure of lubricant from said pump 38 equals or exceeds said datum pressure. The invention also comprises means for enabling the machine to continue to finish the job in process and to prevent restarting of the machine after it has been stopped by the operator when any of the conditions last above stated exist. The invention also comprises means for preventing setting of the clutch by preventing effective operation of the rod 50 when the driving motor 30 is idle or is not operating, and comprises mechanism for relieving the motor of high starting load, or preventing high starting load from being imposed upon the motor when the motor is initially started. We will now proceed to describe these features of the present invention.

A cylinder comprising an upper portion 58 and a lower portion 59 in axial alinement therewith is attached to one end of the frame 1. A pipe 60 from the pump 38 has a branch 61 communicating with a port 62 opening into the upper end of the cylinder portion 58 for delivering oil under pressure into the upper end of said cylinder portion 58. A piston 63 is mounted in the cylinder 58—59 and has a circumferential groove 64 intermediate of its ends. A spring 65 below the piston 63 and mounted in the lower portion 59 of the cylinder functions to move the piston 63 upwardly almost but not quite to the port 62. Extent of upward and downward movement of the piston 63 is limited or regulated by an abutment 66 mounted in the wall of the cylinder 58—59 and projecting into the groove 64. This abutment will stop upward movement of the piston 63 when the upper end of said piston is near but below the port 62, leaving said port open for the admission of oil under pressure into the upper end of the cylinder. A pipe 67 from the pump 38 opens into an oil reservoir 68 provided at the lower end of the frame 1. Thus, when the motor 31 is started, the pump 38 will be operated thereby so long as the motor is running; and, when the supply of lubricating oil in the reservoir 68 is sufficient, a part of the oil will be drawn from said reservoir by the pump 38 and delivered under pressure through the port 62 into the upper end of the cylinder 58 above the piston 63, and said piston will thereby be forced downwardly in opposition to the spring 65 to the extent permitted by the abutment 66, as shown in Fig. 1. However, when there is an insufficient amount of oil in the reservoir 68, or when the pump 38 fails to function properly, or when the flow of oil becomes clogged or otherwise rendered inadequate, the piston 63 will not be moved downwardly by oil delivered thereto under pressure by the pump.

Our invention comprises means for preventing setting of the clutch to drive the shaft 30 by the pulley 33 under the conditions last above stated. Therefore, our invention comprises mechanism or means for preventing operation of the machine under said conditions, because setting of the clutch for driving the shaft 30 by the pulley 33 is a condition precedent to operation of the machine by the power device.

An arm 69 is attached to the rod 50 and projects through an opening 70 into the cylinder 58, 59. When the motor 31 is not running, the pump 38 remains unoperated and the spring 65 is free to move the piston 63 upwardly to the extent permitted by the abutment 66. This assumes that the rod 50 is turned to the position shown in Fig. 2, in which the clutch for driving the shaft 30 by the pulley 33 is loose. In normal operation, the operator should turn the rod 50 to release the clutch before the operation of the motor 31 is stopped. When the rod 50 is turned from the position shown in Fig. 3 to the position shown in Fig. 2 in order to release the clutch, the arm 69 is moved out of the groove 64, leaving the piston 63 free for movement by the spring 65 to carry the groove 64 above the end of the arm 69 and locate a portion of the piston that is below said groove opposite the end of said arm 69. This will prevent turning of the rod 50 far enough to set the clutch for driving the shaft 30 by the pulley 33. As a consequence, when there is an insufficient amount of oil in the reservoir 68, or when the pump 38 becomes ineffective, or when the flow of oil becomes clogged or otherwise rendered inadequate, no sufficient amount of oil will be delivered under pressure through the port 62 into the upper end of the cylinder 58 to effect downward movement of the piston 63 in opposition to the spring 65. Therefore, operation of the machine cannot be initiated under these conditions nor until said conditions are corrected.

The pipe 69 extends upwardly to a manifold 71 from which one or more branches 72 extend to deliver oil to gearing 73, and from which manifold branches 74 also extend to conduct oil therefrom to grooves 75 at the sides of the carriage 4 to lubricate said carriage and the guides therefor, and from which branches 76 also extend to discharge jets of oil 77 toward and against the perforated plate 18 through which the oil passes to the capillary conductor 17. Of course, under the defective conditions mentioned and which prevent initiation of operation of the machine, it is clear that, when there is insufficient lubricating oil for the machine mechanism, operation of the machine will be prevented. But, due to the fact that, when the machine is in operation, the arm 69 extends into the piston groove 64, the machine can continue to operate until the job that is in the machine is finished. A removable and replaceable transparent panel 78 may be provided in connection with the cylinder structure 58, 59 to make possible visual observation and inspection of the conditions existing in said cylinder, and particularly at the groove 64.

From the foregoing, it is clear that this invention attains all of its intended objects and advantages very efficiently and satisfactorily. The invention may be used in various types of machines by easy adaptations. We contemplate such variations as may be necessary or advisable to adapt the machine for the many uses to which it may be satisfactorily applied.

We claim:

1. In a machine tool having elements mounted for operation, a motor, and mechanism operative by said motor for operating said elements; control means movable manually from one position to another position to control initiation of any operation of said mechanism by said motor, a device for preventing effective movement of said control means from said one position and thereby preventing initiation of any operation of said mechanism by said motor, and a pump operated by said motor for applying liquid under pressure to said device and thereby moving said device to a position to permit operation of said means and also to permit all operations of said mechanism by said motor.

2. In a machine tool having elements mounted for operation, gearing for operating said elements, a motor, and a pump operated by said motor for delivering and applying lubricant under pressure to said elements during operation of said elements by said gearing; control means movable manually from one position to another position to initiate operation of said gearing, and devices preventing movement of said control means under predetermined conditions and operated by pressure of said lubricant impelled by said pump to a position leaving said control means free for operation and thereby controlling initiation of operation of said gearing by said motor.

3. In a machine tool having elements mounted for continuous reciprocating movements during operation, and gearing for imparting said reciprocating movements to said elements; a motor for driving said gearing; a pump constantly driven by said motor when said motor is operating for impelling lubricant under pressure to said elements and said gearing; mechanism for operating said gearing by said motor; manually operative means for regulating said mechanism to operate said gearing when said motor is running; and a device including a movable element controlling effective operation of said means actuable by a datum pressure of lubricant from said pump, said element being movable from a position in which said element prevents operation of said means when said pressure is below a datum pressure to a position leaving said means free for operation when said pressure equals or exceeds said datum pressure.

4. In a machine tool having elements mounted for continuous reciprocating movements during operation, gearing for imparting said reciprocating movements to said elements, a motor for operating said gearing, and a clutch device controlling operation of said gearing by said motor; manual means for engaging and disengaging said clutch device, a pump for delivering and applying lubricant under pressure to said elements during operation thereof by said gearing, a device preventing operation of said manual means when said pressure of lubricant from said pump is less than a datum pressure, and connections from said pump for causing lubricant impelled by said pump to operate said last named device and leave said manual means free for operation when said pressure of lubricant from said pump equals or exceeds said datum pressure.

5. In a machine tool having an element mounted for reciprocating movements, gearing for imparting said reciprocating movements to said element, a motor, and mechanism for driving said gearing from said motor including a clutch; a lubricating system including a pump for supplying lubricant under pressure to said element; a device movable manually from one position to another position to effect engagement of said clutch to effect driving of said gearing; and movable means for preventing actuation of said device from said one position to said other position, said last-mentioned means being subject to the pressure of said lubricant in said system and being movable by a datum pressure from a point preventing movement of said device to engage said clutch to a point leaving said device free to effect clutch engagement.

6. In a machine tool having an element mounted for continuous reciprocating movements during effective operation thereof; a lubricating system including a pump for delivering lubricant under pressure to said element during operation of the latter; mechanism for imparting said reciprocating movements to said element; a device movable manually from one position to another position to effect initiation of operation of said mechanism; and hydraulically operable means including a movable part operable by a datum pressure of lubricant in said system, and means yieldably opposing movement of said part, said yieldable means maintaining said movable part in a position preventing movement of said device from said one position when said pressure is below said datum pressure.

JOHN H. SCHREIBER.
FRANCIS H. DEAN.